US012309222B2

(12) United States Patent
Lin et al.

(10) Patent No.: US 12,309,222 B2
(45) Date of Patent: May 20, 2025

(54) EDGE COMPUTING RESOURCE ALLOCATION METHOD, APPARATUS AND DEVICE, AND STORAGE MEDIUM

(71) Applicant: SUZHOU METABRAIN INTELLIGENT TECHNOLOGY CO., LTD., Jiangsu (CN)

(72) Inventors: Kaizhi Lin, Jiangsu (CN); Chao Ding, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/567,646

(22) PCT Filed: Jun. 1, 2022

(86) PCT No.: PCT/CN2022/096538
§ 371 (c)(1),
(2) Date: Dec. 6, 2023

(87) PCT Pub. No.: WO2023/115829
PCT Pub. Date: Jun. 29, 2023

(65) Prior Publication Data
US 2025/0106280 A1    Mar. 27, 2025

(30) Foreign Application Priority Data
Dec. 24, 2021    (CN) .......................... 202111593834.4

(51) Int. Cl.
*G06F 15/173*    (2006.01)
*H04L 67/1008*    (2022.01)
(Continued)

(52) U.S. Cl.
CPC ...... *H04L 67/1012* (2013.01); *H04L 67/1008* (2013.01); *H04L 67/101* (2013.01); *H04W 28/08* (2013.01); *H04W 84/12* (2013.01)

(58) Field of Classification Search
None
See application file for complete search history.

(56) References Cited

U.S. PATENT DOCUMENTS

2019/0260827 A1* 8/2019 Tajima ................ H04L 47/2433

FOREIGN PATENT DOCUMENTS

| CN | 103095597 A | 5/2013 |
|---|---|---|
| CN | 111262906 A | 6/2020 |

(Continued)

*Primary Examiner* — Wing F Chan
*Assistant Examiner* — Andrew Woo
(74) *Attorney, Agent, or Firm* — IPro, PLLC

(57) ABSTRACT

A method, apparatus and device for allocating edge-computation resources and a computer-readable storage medium. The method includes: acquiring WiFi-connection data of terminal devices to be allocated; according to the WiFi-connection data and resource-occupation states of the edge servers, determining target edge servers that the terminal devices to be allocated individually correspond to; and connecting the terminal devices to be allocated to the individually corresponding target edge servers, and controlling the target edge servers to start up services of the individually corresponding terminal devices to be allocated. The present application may automatically select a balanced load-sharing networking strategy in response to the initial networking of a distributed WiFi edge-computation system or a WiFi terminal device being newly added, to realize the effect of load sharing of the edge-computation resources, and improve the efficiency of the application of edge computation.

17 Claims, 6 Drawing Sheets

(51) Int. Cl.
*H04L 67/101* (2022.01)
*H04L 67/1012* (2022.01)
*H04W 28/08* (2023.01)
*H04W 84/12* (2009.01)

(56) References Cited

FOREIGN PATENT DOCUMENTS

| | | | |
|---|---|---|---|
| CN | 111770362 | A | 10/2020 |
| CN | 111835819 | A | 10/2020 |
| CN | 112087312 | A | 12/2020 |
| CN | 113992691 | A | 1/2022 |
| CN | 114465872 | A | 5/2022 |
| WO | 2020253266 | A1 | 12/2020 |

\* cited by examiner

EDGE COMPUTING RESOURCE ALLOCATION METHOD, APPARATUS AND DEVICE, AND STORAGE MEDIUM

CROSS REFERENCE TO RELEVANT APPLICATIONS

The present application claims the priority of the Chinese patent application filed on Dec. 24, 2021 before the China National Intellectual Property Administration with the application number of 202111593834.4 and the title of "EDGE COMPUTING RESOURCE ALLOCATION METHOD, APPARATUS AND DEVICE, AND STORAGE MEDIUM", which is incorporated herein in its entirety by reference.

FIELD

The present application relates to the technical field of edge computation and more particularly, to a method, apparatus and device for allocating edge-computation resources and a computer-readable storage medium.

BACKGROUND

Edge computation is an architecture of distributed computation, in which the operations of application programs, data and services are transferred by the central network nodes to the edge nodes in the network logic to be processed. The edge computation disassembles and cuts the large-scale services that were originally processed completely by the central nodes into parts that are smaller and easier to manage, and distributes them to the edge nodes to be processed. The edge nodes are closer to the user terminal devices, and may accelerate the processing and the transmission of data and reduce delaying. The edge computation is required to automatically process a large quantity of data, and have the capacities such as storage, memory, CPU calculation, AI (Artificial Intelligence) calculation, network transmission and network accessing. When the edge computation is deployed in the field of the client, the distributed WiFi accessing is an important accessing mode, in which the collecting terminal devices are wirelessly connected, which facilitates the deployment of the terminals. The data of the WiFi terminal devices are processed and calculated at the edge servers, and merely the data that are processed are sent to the central server.

In the prior art, a typical edge-computation deployment based on the distributed WiFi terminal devices may be shown in FIG. 1, in which a plurality of WiFi terminal devices are connected to the same edge-server device, and plurality of edge-server devices are externally connected to the same gateway via the Ethernet (Eth), and the same service dispatching system device. When the conventional WiFi terminal devices access to the edge servers, there are two modes of configuration. One of them is manually specifying which of the edge servers each of the WiFi terminal devices accesses to, in which the workload for the configuring is heavy, and the signal intensities and the resource-loading situations that are configured are not necessarily optimum. The other is that each of the WiFi terminal devices automatically identifies which of the edge servers is to connect to obtain the most intensive signal, and the edge server having the best network-connection situation (which is usually the closest edge server) is selected according to the most intensive signal. However, in the process of the automatic connection of the WiFi terminal devices to the closest edge servers having the best signals, it might happen that some of the edge servers are connected to a large quantity of the WiFi terminal devices but the other edge servers are merely connected to a small quantity of the WiFi terminal devices. Therefore, in the distributed WiFi edge-computation environment, it is difficult for the WiFi terminal devices and the edge servers to be evenly distributed. As a result, the edge servers connected to a large quantity of the terminal devices might have an excessively large load and insufficient resources to support the relevant services, while at this point the other edge servers might access to excessively few terminal devices, and be still in the state of a low operating load and sufficient resources. Accordingly, the resource allocation of the edge servers in the distributed WiFi edge-computation scene is unbalanced, which affects the usage of the services, and has a low efficiency of application.

Therefore, how to perform the balanced allocation to the loads of the edge servers, ensure the balanced allocation of the resources of the edge servers, and improve the efficiency of the application of edge computation, is a problem required to be solved urgently currently.

SUMMARY

The present application provides a method for allocating edge-computation resources, wherein the method includes:
acquiring WiFi-connection data of terminal devices to be allocated, wherein the WiFi-connection data include identifier data of edge servers that the terminal devices to be allocated are individually correspondingly connectable to;
according to the WiFi-connection data and resource-occupation states of the edge servers, determining target edge servers that the terminal devices to be allocated individually correspond to; and
connecting the terminal devices to be allocated to the individually corresponding target edge servers, and controlling the target edge servers to start up services of the individually corresponding terminal devices to be allocated.

In some embodiments, the step of acquiring the WiFi-connection data of the terminal devices to be allocated includes:
receiving the WiFi-connection data that are sent by optimum-signal servers that the terminal devices to be allocated are individually connected to, wherein the optimum-signal servers refer to connectable edge servers having highest connection-signal qualities among connectable edge servers that the terminal devices to be allocated individually correspond to, and the WiFi-connection data further include data of the connection-signal qualities of the connectable edge servers that the terminal devices to be allocated individually correspond to.

In some embodiments, before the step of receiving the WiFi-connection data that are sent by the optimum-signal servers that the terminal devices to be allocated are individually connected to, the method further includes:
controlling a current terminal device to be allocated to perform WiFi-connecting sequentially to the edge servers, and detecting data of the connection-signal qualities of the connected edge servers, wherein the current terminal device to be allocated is any one of the terminal devices to be allocated; and
controlling the current terminal device to be allocated to be connected to a current optimum-signal server, and sending current WiFi-connection data to the current optimum-signal server, wherein the current optimum-signal server refers to a connectable edge server having a highest connection-signal quality among the connectable edge servers that the current terminal device to be allocated corresponds to, and the current WiFi-connection data contain identifier data of the edge servers that the current terminal device to be allocated has already been connected to and have data of the connection-signal qualities higher than a signal-quality threshold.

In some embodiments, the step of connecting the terminal devices to be allocated to the individually corresponding target edge servers includes:

changing WiFi-connections of the terminal devices to be allocated from the individually connected optimum-signal servers to the individually corresponding target edge servers.

In some embodiments, the step of acquiring the WiFi-connection data of the terminal devices to be allocated includes:

controlling a current terminal device to be allocated to perform WiFi-connecting sequentially to the edge servers, and detecting data of the connection-signal qualities of the connected edge servers, wherein the current terminal device to be allocated is any one of the terminal devices to be allocated;

controlling the current terminal device to be allocated to send current WiFi-connection data to the connected connectable edge servers, wherein the current WiFi-connection data include identifier data of the edge servers that the current terminal device to be allocated is currently connected to and have data of the connection-signal qualities higher than a signal-quality threshold, and the data and the connection-signal qualities; and according to the received current WiFi-connection data sent by the connectable edge servers that the current terminal device to be allocated corresponds to, acquiring the WiFi-connection data of the current terminal device to be allocated.

In some embodiments, the step of, according to the WiFi-connection data and the resource-occupation states of the edge servers, determining the target edge servers that the terminal devices to be allocated individually correspond to includes:

according to the resource-occupation states and a resource-safety threshold of the edge servers, and WiFi-connection data and pre-estimated resource-occupation states of all of WiFi terminal devices, determining the target edge servers that the terminal devices to be allocated individually correspond to, wherein the all of WiFi terminal devices include the terminal devices to be allocated and already-allocated terminal devices that the edge servers are individually connected to.

In some embodiments, the step of, according to the resource-occupation states and the resource-safety threshold of the edge servers, and the WiFi-connection data and the pre-estimated resource-occupation states of all of the WiFi terminal devices, determining the target edge servers that the terminal devices to be allocated individually correspond to includes:

according to the resource-occupation states and the resource-safety threshold of the edge servers, and the WiFi-connection data and the pre-estimated resource-occupation states of all of the WiFi terminal devices, calculating a system-efficiency evaluation value when any one of the connectable edge servers that the terminal devices to be allocated individually correspond to is connected, and determining the target edge servers that the terminal devices to be allocated individually correspond to by using the system-efficiency evaluation values.

In some embodiments, the step of, according to the resource-occupation states and the resource-safety threshold of the edge servers, and the WiFi-connection data and the pre-estimated resource-occupation states of all of the WiFi terminal devices, calculating the system-efficiency evaluation value when any one of the connectable edge servers that the terminal devices to be allocated individually correspond to is connected, and determining the target edge servers that the terminal devices to be allocated individually correspond to by using the system-efficiency evaluation values includes:

determining the optimum-signal servers that the terminal devices to be allocated individually correspond to as individually corresponding edge servers to be connected, wherein the optimum-signal servers refer to connectable edge servers having highest connection-signal qualities among connectable edge servers that the terminal devices to be allocated individually correspond to;

determining the current terminal device to be allocated according to a preset iteration sequence, wherein the current terminal device to be allocated is any one of the terminal devices to be allocated;

according to the resource-occupation states and a resource-safety threshold of the edge servers, and WiFi-connection data and pre-estimated resource-occupation states of all of WiFi terminal devices, calculating system-efficiency evaluation values that all of the connectable edge servers corresponding to the current terminal device to be allocated individually correspond to;

updating the edge server to be connected corresponding to the current terminal device to be allocated according to the system-efficiency evaluation values;

when a current iteration time quantity reaches an iteration threshold, determining the edge servers to be connected that the terminal devices to be allocated individually correspond to as individually corresponding target edge servers; and when the current iteration time quantity does not reach the iteration threshold, adding 1 to the current iteration time quantity, determining a next terminal device to be allocated to be the current terminal device to be allocated according to the preset iteration sequence, and executing the step of, according to the resource-occupation states and the resource-safety threshold of the edge servers, and the WiFi-connection data and the pre-estimated resource-occupation states of all of the WiFi terminal devices, calculating the system-efficiency evaluation values that all of the connectable edge servers corresponding to the current terminal device to be allocated individually correspond to.

In some embodiments, the step of, according to the resource-occupation states and the resource-safety threshold of the edge servers, and the WiFi-connection data and the pre-estimated resource-occupation states of all of the WiFi terminal devices, calculating the system-efficiency evaluation values that all of the connectable edge servers corresponding to the current terminal device to be allocated individually correspond to includes:

by using $(\Pi(0:n)Fs(Sx-y-Gs))*(\Pi(0:m)(Fcpu(RRcpu-Gcpu)*Fgpu(RRgpu-Ggpu)*Fmem(RRmem-Gmem)*Fdisk(RRdisk-Gdisk)*Fnet(RRnet-Gnet)*Fwifi(RRwifi-Gwifi)$

*FΔdisk((RRdisk-Gdisk)/ΔRRdisk-Gtime))). pre-estimating and calculating the system-efficiency evaluation values after the current terminal device to be allocated is connected to each of the corresponding connectable edge servers in response to the terminal devices to be allocated other than the current terminal device to be allocated being connected to the individually corresponding edge servers to be connected, wherein n is a quantity of the WiFi terminal devices connected to the edge servers, Fs is a signal-quality weight, Sx-y is a signal quality between the WiFi terminal device x and the edge server y, Gs is a signal-quality threshold, m is a quantity of the edge servers, Fcpu, Fgpu, Fmem, Fdisk, Fnet, Fwifi and FΔdisk are a CPU-computational-resource weight, an AI-computational-resource weight, an memory-capacity-resource weight, a hard-disk-storage-resource weight, a network-transmission-resource weight, a network-access-resource weight and a hard-disk-storage-consumption-speed weight respectively, RRcpu, RRgpu, RRmem, RRdisk, RRnet, RRwifi and ΔRRdisk are a remaining CPU computational resource, a remaining AI computational resource, a remaining memory capacity resource, a remaining hard-disk storage resource, a remaining network-transmission resource, a remaining network-access resource and a remaining hard-disk storage consumption speed respectively, and Gcpu, Ggup, Gmem, Gdisk, Gnet, Gwifi and Gtime are a CPU-computational-resource remaining safety threshold, an AI-computational-resource remaining safety threshold, an memory-capacity-resource remaining safety threshold, a hard-disk-storage-resource remaining safety threshold, a network-transmission-resource remaining safety threshold, a network-access-resource remaining safety threshold and a hard-disk-storage-consumption-speed remaining safety threshold respectively.

The present application further provides an apparatus for allocating edge-computation resources, wherein the apparatus includes:

an acquiring module configured for acquiring WiFi-connection data of terminal devices to be allocated, wherein the WiFi-connection data include identifier data of edge servers that the terminal devices to be allocated are individually correspondingly connectable to;

a determining module configured for, according to the WiFi-connection data and resource-occupation states of the edge servers, determining target edge servers that the terminal devices to be allocated individually correspond to; and an allocating module configured for connecting the terminal devices to be allocated to the individually corresponding target edge servers, and controlling the target edge servers to start up services of the individually corresponding terminal devices to be allocated.

A device for allocating edge-computation resources, wherein the device includes a memory and one or more processors, the memory stores a computer-readable instruction, and the computer-readable instruction, when executed by the one or more processors, causes the one or more processors to implement the steps of the method for allocating edge-computation resources stated above.

One or more non-volatile computer-readable storage mediums storing a computer-readable instruction, wherein the computer-readable instruction, when executed by one or more processors, causes the one or more processors to implement the steps of the method for allocating edge-computation resources stated above.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other figures according to the provided figures without paying creative work.

DETAILED DESCRIPTION

In order to make the objects, the technical solutions and the advantages of the embodiments of the present application clearer, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 2:
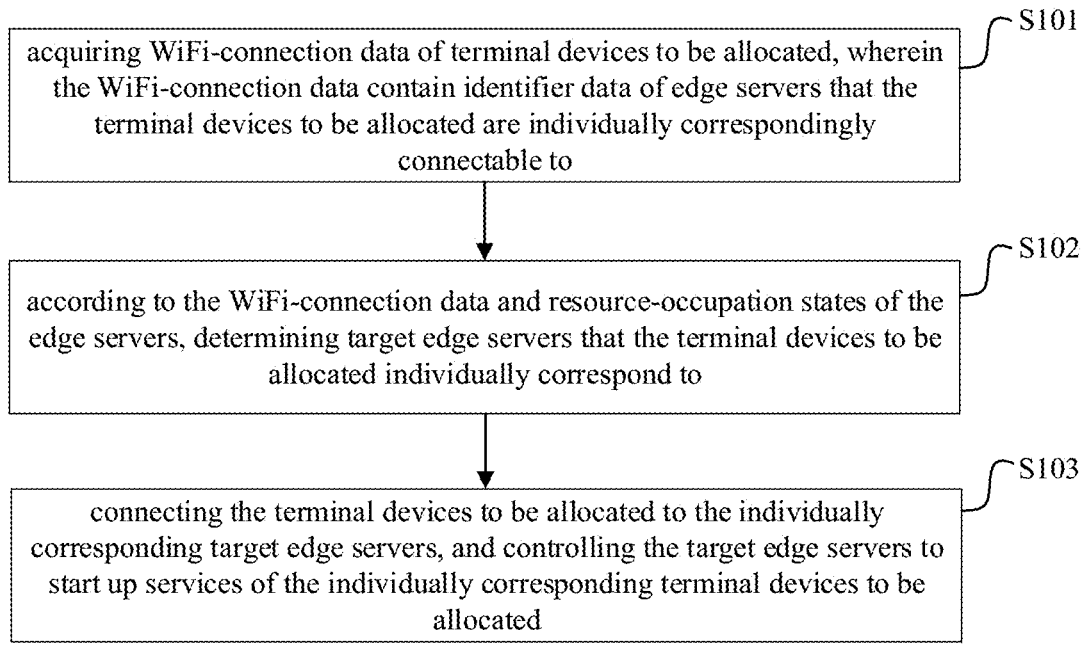
FIG. 2 is a flow chart of a method for allocating edge-computation resources according to one or more embodiments of the present application.

Referring to FIG. 2, FIG. 2 is a flow chart of a method for allocating edge-computation resources according to an embodiment of the present application. The method may include:

Step 101: acquiring WiFi-connection data of terminal devices to be allocated, wherein the WiFi-connection data include identifier data of edge servers that the terminal devices to be allocated are individually correspondingly connectable to.

It may be understood that the terminal devices to be allocated in this step may be WiFi terminal devices that are required to be allocated to be connected to the corresponding target edge servers and start starting up the corresponding services. In other words, the terminal device to be allocated may be connected to any one of the edge servers (such as an optimum-signal server) that may be connected but not start up the corresponding service at the connected edge server, and the terminal device to be allocated may also not be connected to an edge server.

In some embodiments, the connectable edge servers that the terminal devices to be allocated in this step individually correspond to may be the edge servers that the terminal devices to be allocated may have a WiFi-connection with, and may also be the edge servers that the terminal devices to be allocated may have a WiFi-connection with and have connection-signal qualities higher than a signal-quality threshold, which is not limited in the present embodiment in any form. The WiFi-connection data of the terminal devices to be allocated in this step may contain the identifier data (i.e., the data of the selectable connection paths) of the connectable edge servers that the terminal devices to be allocated individually correspond to, so that the processor may use the identifier data to determine the connectable edge servers that the terminal devices to be allocated individually correspond to. The WiFi-connection data of the terminal devices to be allocated may further contain the data of the connection-signal qualities of the connectable edge servers that the terminal devices to be allocated individually correspond to. i.e., the data of the connection-signal qualities of the terminal devices to be allocated when they are connected to the individually corresponding connectable edge servers, which is not limited in the present embodiment in any form.

Figure 1:
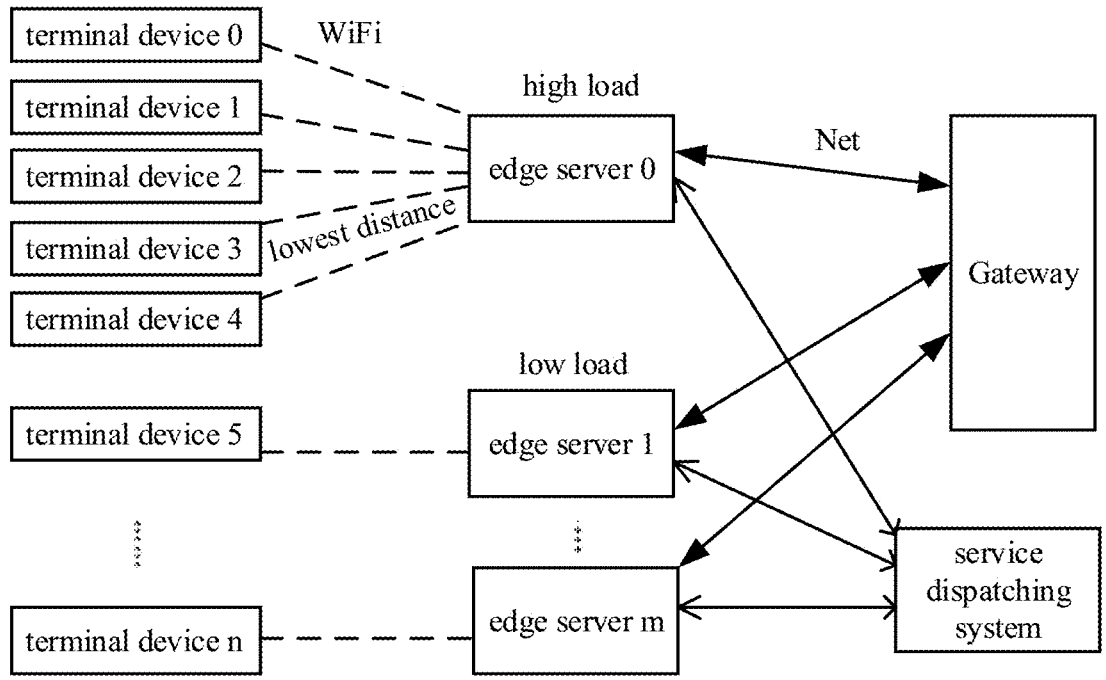
FIG. 1 is a schematic diagram of a typical edge-computation deployment of distributed WiFi terminal devices.

It should be noted that the method according to the present embodiment may be applied to the service dispatching system device shown in FIG. 1, and may also be applied to any one of the edge servers, which is not limited in the present embodiment in any form. The particular mode of acquiring the WiFi-connection data of the terminal devices to be allocated by the processor in this step may be configured by a person skilled in the art freely according to practical scenes and user demands. For example, the processor may receive a WiFi-connection datum of each of the terminal devices to be allocated that is sent by a connectable edge server (for example, an optimum-signal server) corresponding to the terminal device to be allocated. For example, the processor may receive the WiFi-connection datum of each of the terminal devices to be allocated that is sent by the optimum-signal server connected to the terminal device to be allocated. The processor may directly receive the WiFi-connection data of the terminal devices to be allocated that are sent by all of the connectable edge servers that the terminal devices to be allocated individually correspond to. They are not limited in the present embodiment in any form.

For example, when the processor receives the WiFi-connection data of the terminal devices to be allocated that are sent by the optimum-signal servers that the terminal devices to be allocated individually correspond to, in this step, the processor of the service dispatching system device may receive the WiFi-connection data that are sent by the optimum-signal servers that the terminal devices to be allocated are individually connected to, wherein the optimum-signal servers refer to the connectable edge servers having the highest connection-signal qualities among the connectable edge servers that the terminal devices to be allocated individually correspond to, and the WiFi-connection data further contain the data of the connection-signal qualities of the connectable edge servers that the terminal devices to be allocated individually correspond to.

Correspondingly, before this step, the processor of the service dispatching system device may control a current terminal device to be allocated to perform WiFi-connecting sequentially to the edge servers, and detect the data of the connection-signal qualities of the connected edge servers; and control the current terminal device to be allocated to be connected to a current optimum-signal server, and send the current WiFi-connection data to the current optimum-signal server, so as to send the current WiFi-connection data to the service dispatching system device by using the current optimum-signal server, wherein the current terminal device to be allocated is any one of the terminal devices to be allocated, the current optimum-signal server refers to the connectable edge server having the highest connection-signal quality among the connectable edge servers that the current terminal device to be allocated corresponds to, and the current WiFi-connection data contain the identifier data of the edge servers that the current terminal device to be allocated has already been connected to and have the data of the connection-signal qualities higher than a signal-quality threshold.

Correspondingly, when the processor receives the WiFi-connection data of the terminal devices to be allocated that are sent by all of the connectable edge servers that the terminal devices to be allocated individually correspond to, in this step, the processor of the service dispatching system device may, according to the received current WiFi-connection data that are sent by the connectable edge servers that the terminal devices to be allocated are individually connected to, acquire the WiFi-connection data of the terminal devices to be allocated, wherein the current WiFi-connection data may be the identifier data and the data of the connection-signal qualities of the connectable edge server that each of the terminal devices to be allocated is currently connected to. When the connectable edge servers that the terminal devices to be allocated individually correspond to are the edge servers that the terminal devices to be allocated may have a WiFi-connection with and have connection-signal qualities higher than the signal-quality threshold, in this step, the processor may control a current terminal device to be allocated to perform WiFi-connecting sequentially to the edge servers, and detect the data of the connection-signal qualities of the connected edge servers; control the current terminal device to be allocated to send the current WiFi-connection data to the connected connectable edge servers; and according to the received current WiFi-connection data sent by the connectable edge servers that the current terminal device to be allocated corresponds to, acquire the WiFi-connection data of the current terminal device to be allocated, wherein the current terminal device to be allocated is any one of the terminal devices to be allocated, and the current WiFi-connection data contain the identifier data of the edge servers that the current terminal device to be allocated is currently connected to and have the data of the connection-signal qualities higher than a signal-quality threshold, and the data and the connection-signal qualities.

In some embodiments, each of the WiFi terminal devices may have the built-in WiFi-connection relations of all of the edge servers, to support the WiFi-connections with the edge servers. When the WiFi terminal device is being started up, the WiFi terminal device may automatically poll the WiFi-connection relations one by one, be connected to all of the edge servers, confirm which edge servers may be normally connected, record the qualities and the intensities of the WiFi signals connected to the edge servers, send all of the connection relations (i.e., the identifier data) and the data of the connection-signal qualities, or the connection relations (i.e., the identifier data) and the data of the connection-signal qualities that have a signal-connection quality higher than the signal-quality threshold, to the service dispatching system device, and maintain them as a WiFi-connection-signal-quality table.

Figure 3:
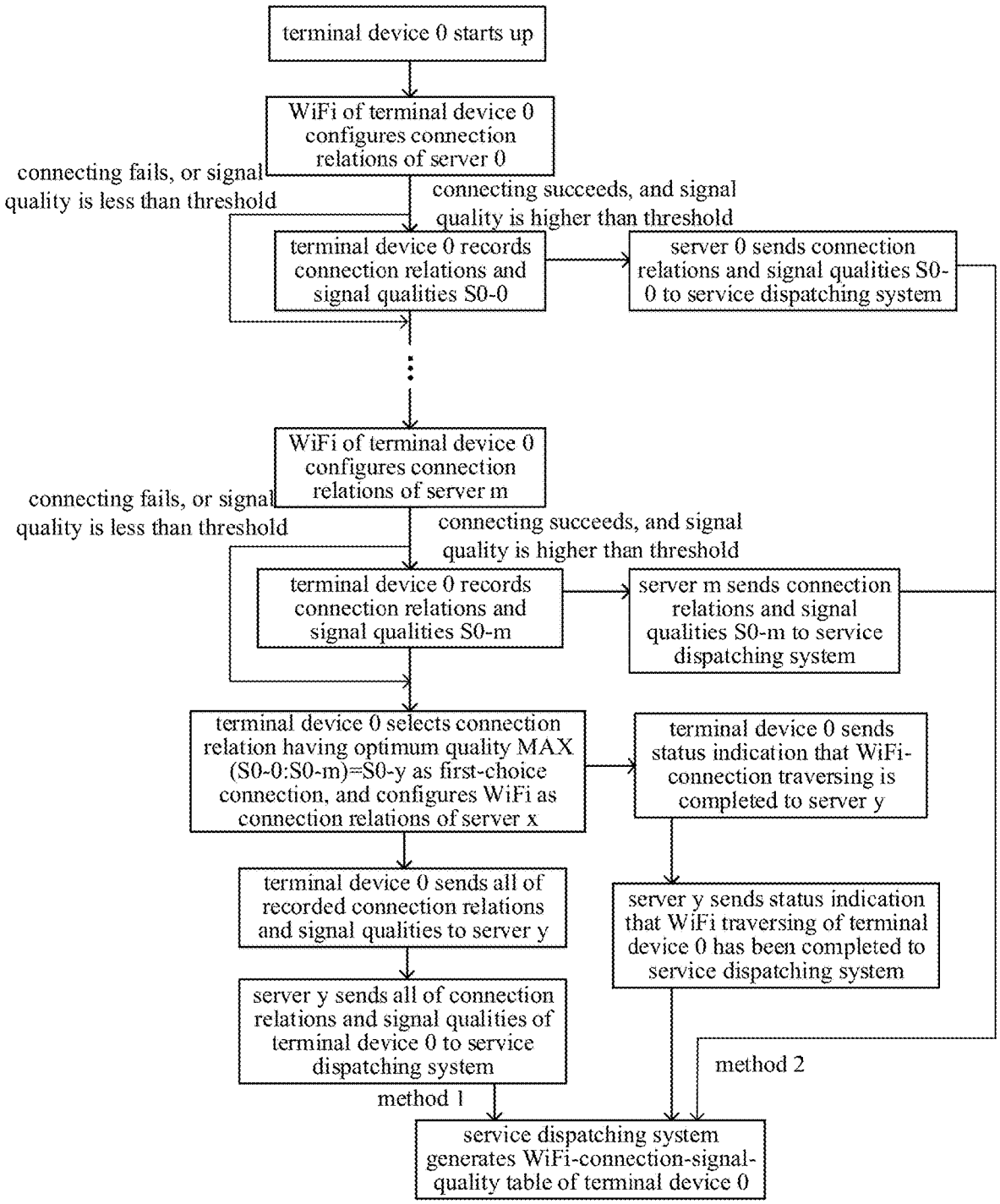
FIG. 3 is a schematic flow chart of the acquirement of the WiFi-connection data of another method for allocating edge-computation resources according to one or more embodiments of the present application.

For example, the built-in WiFi-connection relations in the WiFi terminal devices may contain a list of the WiFi edge servers that are connectable, the available channels, the secret key of each of the connections, and so on. As shown in FIG. 3, taking the WiFi terminal device 0 as an example, after the starting-up, according to the list of the WiFi-connection relations, it connects the edge servers 0-$m$ in the list one by one, records normal connections or abnormal connections, records the signal-quality intensities when the connection is normal, sets the signal-quality threshold Gs that is required by the WiFi signal-quality intensities, records the connection relations (i.e., the identifier data of the connectable edge servers) higher than the signal-quality threshold Gs and the signal qualities S0-$x$ in the WiFi terminal device 0, and, after all of the edge servers in the list are completely traversed, selects the edge server having the best connection-signal quality MAX (S0-0:S0-$m$) to connect, and sends to the edge server a status indication that the traversing of the WiFi-connections is completed. The WiFi terminal device may transmit the connection relations higher than the signal-quality threshold Gs and the signal qualities (S0-0:S0-$m$) that are obtained by the traversing of this device to the service dispatching system device via the finally connected edge server having the optimum signal. In some embodiments, each of the edge servers, when receiving the traversing connection of the WiFi terminal device, records the connection relations higher than the signal-quality threshold and the signal qualities, each of the edge servers transmits the connection relations and the signal qualities S0-$x$ to the service dispatching system, and the finally connected edge server sends to the service dispatching system a status indication that the WiFi traversing of that terminal device is completed. Accordingly, a WiFi-connection-signal-quality table corresponding to the WiFi-connection data of that WiFi terminal device is formed in the service dispatching system device.

Step 102: according to the WiFi-connection data and resource-occupation states of the edge servers, determining target edge servers that the terminal devices to be allocated individually correspond to.

The edge servers according to the present embodiment may be the edge servers that are connected to the service dispatching system device, for example, the edge servers connected to the same gateway shown in FIG. 1. In this step, the resource-occupation states of each of the edge servers may include the states of the occupation of any one or more of the CPU computational resource, the AI computational resource, the memory capacity resource, the hard-disk storage resource, the network transmission resource, the network access resource and the hard-disk-storage-resource consumption speed. When the resource-occupation states include the states of the occupation of the CPU computational resource, the AI computational resource, the memory capacity resource, the hard-disk storage resource, the network transmission resource, the network access resource and the hard-disk-storage-resource consumption speed, the resource-occupation states may include the remaining CPU computational resource (Rcpu, the remaining AI computational resource (Rgpu), the remaining memory capacity resource (Rmem, the remaining hard-disk storage resource (Rdisk, the remaining network-transmission resource (Rnet, the remaining network-access resource (Rwifi) and the remaining-hard-disk-storage-resource consumption speed (ΔRdisk).

It may be understood that, in this step, the processor may, by using the resource-occupation states and the edge servers and the WiFi-connection data of the terminal devices to be allocated, determine one edge server that each of the terminal devices to be allocated is to be allocated to be connected to (i.e., the target edge server), so as to realize the balanced allocation of the resources of the edge servers.

In some embodiments, the particular mode of, according to the WiFi-connection data and the resource-occupation states of the edge servers, determining the target edge servers that the terminal devices to be allocated individually correspond to by the processor in this step may be configured by a person skilled in the art freely according to practical scenes and user demands. For example, the processor, according to the WiFi-connection data and the resource-occupation states of the edge servers, directly determines the connectable edge servers that the terminal devices to be allocated individually correspond to and have the lowest resource-occupation states to be the target edge servers. The processor may also, according to the resource-occupation states and a resource-safety threshold of the edge servers, and the WiFi-connection data and the pre-estimated resource-occupation states of all of the WiFi terminal devices, determine the target edge servers that the terminal devices to be allocated individually correspond to, wherein the all of WiFi terminal devices include the terminal devices to be allocated and the already-allocated terminal devices that the edge servers are individually connected to. It is not limited in the present embodiment in any form.

Correspondingly, the already-allocated terminal devices may be the WiFi terminal devices that have already been allocated to be connected to the corresponding target edge servers and started up the corresponding services. The resource-safety thresholds of the edge servers may be the normal operation level lines of the various types of resources (for example, the CPU computational resource, the AI computational resource and the memory capacity resource) that the edge servers require consuming in the calculation operations. For example, the resource-safety thresholds may include a CPU-computational-resource remaining safety threshold (Gcpu), an AI-computational-resource remaining safety threshold (Ggup, an memory-capacity-resource remaining safety threshold (Gmem), a hard-disk-storage-resource remaining safety threshold (Gdisk), a network-transmission-resource remaining safety threshold (Gnet), a network-access-resource remaining safety threshold (Gwifi) and a hard-disk-storage-consumption-speed remaining safety threshold (Gtime, i.e., a time threshold). When one of the edge servers has operated beyond the resource-safety thresholds (for example, Rcpu is less than Gcpu), it is considered that the system is in an unhealthy loading state, which might affect the normal operation of the services. Regarding the remaining-hard-disk-storage-resource consumption speed ΔRdisk, taking into consideration the predicted duration for which the hard-disk storage resource decreases to Gdisk, the time threshold Gtime is set, wherein ΔRdisk is required to be less than (Rdisk-Gdisk)/Gtime, so as to ensure that, after operation for the duration of Gtime, it does not happen that the remaining hard-disk capacity exceeds the corresponding safety threshold.

Correspondingly, the pre-estimated resource-occupation states of all of the WiFi terminal devices may be the quantities of the resources of the edge servers that are required to be occupied by the task operations of the WiFi terminal devices that are pre-estimated or pre-configured by the edge servers connected to the WiFi terminal devices (or the service dispatching system device), for example, a pre-estimated occupied CPU computational resource (Dcpu), a pre-estimated occupied AI computational resource (Dgpu), a pre-estimated occupied memory capacity resource (Dmem), a pre-estimated occupied hard-disk storage resource (Ddisk), a pre-estimated occupied network transmission resource (Dnet), a pre-estimated occupied network access resource (Dwifi) and a pre-estimated hard-disk-storage-resource consumption speed (ΔDdisk). For example, the edge servers may send the pre-estimated resource-occupation states of the WiFi terminal devices that they are individually connected to to the service dispatching system device.

It should be noted that the particular mode of, according to the resource-occupation states and the resource-safety threshold of the edge servers, and the WiFi-connection data and the pre-estimated resource-occupation states of all of the WiFi terminal devices, determining the target edge servers that the terminal devices to be allocated individually correspond to by the processor may be configured freely by a person skilled in the art. For example, the processor may, according to the resource-occupation states and a resource-safety threshold of the edge servers, and the WiFi-connection data and the pre-estimated resource-occupation states of all of the WiFi terminal devices, pre-estimate and calculate the system efficiency (i.e., the system-efficiency evaluation values) of the edge-computation system that is formed when the terminal devices to be allocated are connected to any one of the individually corresponding connectable edge servers, thereby, by using the system-efficiency evaluation values, determining the target edge servers that the terminal devices to be allocated individually correspond to. In other words, in this step, the processor may, according to the resource-occupation states and the resource-safety threshold of the edge servers, and the WiFi-connection data and the pre-estimated resource-occupation states of all of the WiFi terminal devices, calculate the system-efficiency evaluation value when any one of the connectable edge servers that the terminal devices to be allocated individually correspond to is connected, and by using the system-efficiency evaluation values, determining the target edge servers that the terminal devices to be allocated individually correspond to.

Figure 4:
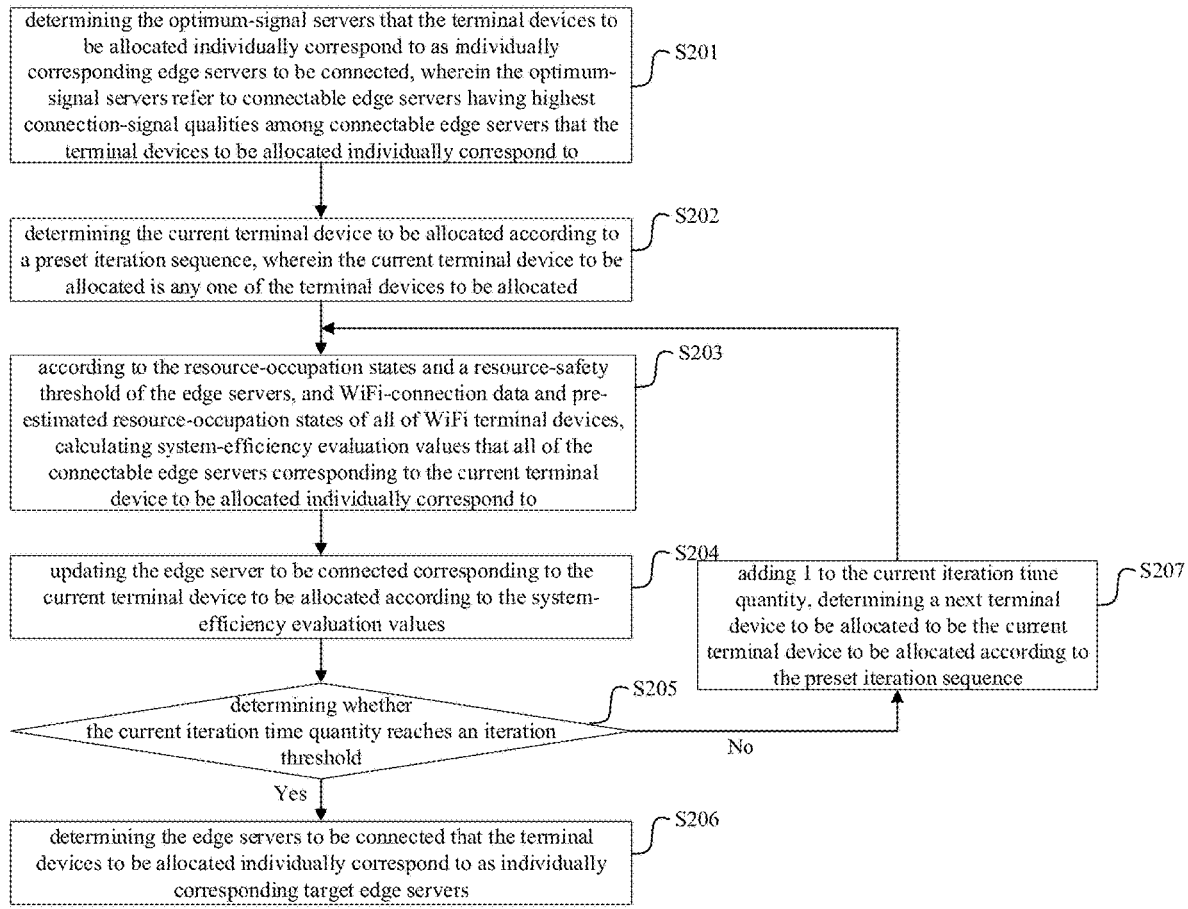
FIG. 4 is a schematic flow chart of the determination of the target edge servers of another method for allocating edge-computation resources according to one or more embodiments of the present application.

In some embodiments, in this step, the processor may, by using the method for determining the target edge servers shown in FIG. 4, by the system-efficiency assessment, determine the target edge servers that the terminal devices to be allocated individually correspond to. In other words, the step 102 may include:

Step 201: determining the optimum-signal servers that the terminal devices to be allocated individually correspond to as individually corresponding edge servers to be connected, wherein the optimum-signal servers refer to connectable edge servers having highest connection-signal qualities among connectable edge servers that the terminal devices to be allocated individually correspond to.

In some embodiments, in this step, the processor may, at the first time of the iteration (i.e., the initial state), use the optimum-signal servers that the terminal devices to be allocated individually correspond to as the individually corresponding edge servers to be connected.

Step 202: according to a preset iteration sequence, determining the current terminal device to be allocated, wherein the current terminal device to be allocated is any one of the terminal devices to be allocated.

It may be understood that the preset iteration sequence in this step may be a preset sequence for iterative selection of all of the terminal devices to be allocated; in other words, at each time of the iteration, one of the terminal devices to be allocated is selected as the current terminal device to be allocated. For example, the preset iteration sequence may be the sequence of the circulation of all of the terminal devices to be allocated.

In some embodiments, the sequence of this step and the step 201 is not limited in the present embodiment. The sequence may be, as shown in the present embodiment, firstly executing the step 201 and subsequently executing the step 202, may also be firstly executing the step 202 and subsequently executing the step 201, and may also be executing them simultaneously.

Step 203: according to the resource-occupation states and a resource-safety threshold of the edge servers, and WiFi-connection data and pre-estimated resource-occupation states of all of WiFi terminal devices, calculating assessed system-efficiency values that all of the connectable edge servers corresponding to the current terminal device to be allocated individually correspond to.

It may be understood that the system-efficiency evaluation values that all of the connectable edge servers corresponding to the current terminal device to be allocated individually correspond to in this step may be the system-efficiency evaluation values after the current terminal device to be allocated is connected to each of the corresponding connectable edge servers in response to the terminal devices to be allocated other than the current terminal device to be allocated being connected to the individually corresponding edge servers to be connected that are pre-estimated and calculated by the processor.

In some embodiments, the particular mode of, according to the resource-occupation states and the resource-safety threshold of the edge servers, and the WiFi-connection data and the pre-estimated resource-occupation states of all of the WiFi terminal devices, calculating the system-efficiency evaluation values that all of the connectable edge servers corresponding to the current terminal device to be allocated individually correspond to by the processor in this step may be configured freely by a person skilled in the art. For example, the processor may, by using $(\Pi(0:n)Fs(Sx-y-Gs))*(\Pi(0:m)(Fcpu(RRcpu-Gcpu)*Fgpu(RRgpu-Ggpu)*Fmem(RRmem-Gmem)*Fdisk(RRdisk-Gdisk)*Fnet(RRnet-Gnet)*Fwifi(RRwifi-Gwifi)*F\Delta disk((RRdisk-Gdisk)/\Delta RRdisk-Gtime)))$, pre-estimate and calculate the system-efficiency evaluation values after the current terminal device to be allocated is connected to each of the corresponding connectable edge servers in response to the terminal devices to be allocated other than the current terminal device to be allocated being connected to the individually corresponding edge servers to be connected, wherein n is the quantity of the WiFi terminal devices connected to the edge servers, Fs is the signal-quality weight, Sx-y is the signal quality between the WiFi terminal device x and the edge server y, Gs is the signal-quality threshold, m is the quantity of the edge servers, Fcpu, Fgpu, Fmem, Fdisk, Fnet, Fwifi and FΔdisk are a CPU-computational-resource weight, an AI-computational-resource weight, an memory-capacity-resource weight, a hard-disk-storage-resource weight, a network-transmission-resource weight, a network-access-resource weight and a hard-disk-storage-consumption-speed weight respectively, RRcpu, RRgpu, RRmem, RRdisk, RRnet, RRwifi and ΔRRdisk are a remaining CPU computational resource, a remaining AI computational resource, a remaining memory capacity resource, a remaining hard-disk storage resource, a remaining network-transmission resource, a remaining network-access resource and a remaining hard-disk storage consumption speed respectively, and Gcpu, Ggup, Gmem, Gdisk, Gnet, Gwifi and Gtime are a CPU-computational-resource remaining safety threshold, an AI-computational-resource remaining safety threshold, an memory-capacity-resource remaining safety threshold, a hard-disk-storage-resource remaining safety threshold, a network-transmission-resource remaining safety threshold, a network-access-resource remaining safety threshold and a hard-disk-storage-consumption-speed remaining safety threshold respectively. Correspondingly, when the remaining resource of a certain type of the resources is less than the remaining safety threshold of that resource, the weight of that type of resource may be 0. For example, when RRcpu0) is less than Gcpu0, Fcpu may be 0).

Figure 5:
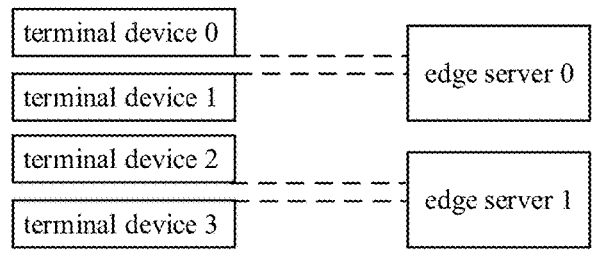
FIG. 5 is a schematic diagram of the networking topology after the connection of the current terminal device to be allocated of another method for allocating edge-computation resources according to one or more embodiments of the present application.

For example, when the terminal devices to be allocated other than the current terminal device to be allocated are connected to the individually corresponding edge servers to be connected, when the networking topology after the current terminal device to be allocated is connected to one of its corresponding connectable edge servers is FIG. 5, the system-efficiency evaluation value corresponding to the connectable edge server is =(Fs(G0-0-Gs0)*Fs(G1-0-Gs1)*Fs(G2-1-Gs2)*Fs(G3-1-Gs3))*(Fcpu (Rcpu0-Dcpu0-Dcpu1-Gcp u0)*Fgpu(Rgpu0-Dgpu0Dgpu1-Ggpu0)*Fmem(Rmem0-Dmem0-Dmem1-Gmem0))*Fdisk(Rdisk0-Ddisk0-Ddisk1-Gdisk0))*Fnet(Rnet0-Dnet0-Dnet1-Gnet0)*Fwifi(Rwifi0-Dwifi0-Dwifi1-Gwifi0)*FΔdisk((Rdisk0-Ddisk0-Ddisk1-Gdisk0)/(ΔRdisk0+ΔDdisk0+ΔDdisk1)-Gtime0)*(Fcpu(Rc pu1-Dcpu2-Dcpu3-Gcpu1)*Fgpu(Rgpu1-Dgpu2-Dgpu3-Ggpu1)*Fmem(Rmem1-Dmem2-Dme m3-Gmem1)*Fdisk(Rdisk1-Ddisk2-Ddisk2-Gdisk1)*Fnet(Rnet1-Dnet2-Dnet3-Gnet1)*Fwifi(R wifi1-Dwifi2-Dwifi3-Gwifi1)*FΔdisk((Rdisk1-Ddisk2-Ddisk3-Gdisk1)/(ΔRdisk1+ΔDdisk2+ΔD disk3)-Gtime1), wherein G0-0 is the signal quality between the WiFi terminal device 0 and the edge server 0. Gs0 is the signal-quality threshold of the WiFi terminal device 0 RRcpu0=Rcpu0-Dcpu0-Dcpu1, RRcpu0 is the predicted remaining CPU computational resource of the edge server 0 after the current terminal device to be allocated is connected to the connectable edge server, and Rcpu0 is the remaining CPU computational resource of the edge server 0 before the current terminal device to be allocated is connected to the connectable edge server when the terminal devices to be allocated other than the current terminal device to be allocated are connected to the individually corresponding edge servers to be connected.

Step 204: according to the system-efficiency evaluation values, updating the edge server to be connected corresponding to the current terminal device to be allocated.

In some embodiments, in this step, the processor may directly update the edge server to be connected corresponding to the current terminal device to be allocated to be the connectable edge server having the maximum assessed system-efficiency value. The processor may also update the edge server to be connected corresponding to the current terminal device to be allocated to be the connectable edge server that satisfies the requirements on the resource-safety thresholds and has the maximum assessed system-efficiency value, so that, after the current terminal device to be allocated is connected to the edge server to be connected, the occupations of the various types of resources do not exceed the corresponding safety thresholds.

Step 205: determining whether the current iteration time quantity reaches an iteration threshold; when yes, then entering the step 206; and when no, then entering the step 207.

The iteration threshold in this step may be a preset time quantity. The particular numerical value of the iteration threshold is not limited in the present embodiment. For example, the iteration threshold may be greater than or equal to the quantity of the terminal devices to be allocated. For example, when the quantity of the terminal device to be allocated is 1, the iteration threshold may be 1. When the quantity of the terminal devices to be allocated is greater than 1, the iteration threshold is greater than the quantity of the terminal devices to be allocated. For example, when the quantity of the terminal devices to be allocated is 2, the iteration threshold may be 4 or a numerical value greater than 4. When the current iteration time quantity reaches the iteration threshold, the process enters the step 206, i.e., determining that the current iteration time quantity reaches the iteration threshold, and, based on the determined current iteration time quantity, entering the step 206. When the current iteration time quantity does not reach the iteration threshold, the process enters the step 207, i.e., determining that the current iteration time quantity does not reach the iteration threshold, and, based on the determined current iteration time quantity, entering the step 207.

Step 206: determining the edge servers to be connected that the terminal devices to be allocated individually correspond to as individually corresponding target edge servers.

It may be understood that, in this step, the processor may, when the current iteration time quantity reaches the iteration threshold, determine the edge servers to be connected that the terminal devices to be allocated that have been updated individually correspond to as the individually corresponding target edge servers, to complete the determination on the target edge servers that the terminal devices to be allocated individually correspond to.

Step 207: adding 1 to the current iteration time quantity, according to the preset iteration sequence, determining a next terminal device to be allocated to be the current terminal device to be allocated, and entering the step 203.

It may be understood that, in this step, the processor may, when the current iteration time quantity does not reach the iteration threshold, update the iteration time quantity, according to the preset iteration sequence, determine the terminal device to be allocated of the next time of iteration (i.e., the next terminal device to be allocated) to be the current terminal device to be allocated, and enter the step 203 to continuously perform the iteration.

Figure 6:
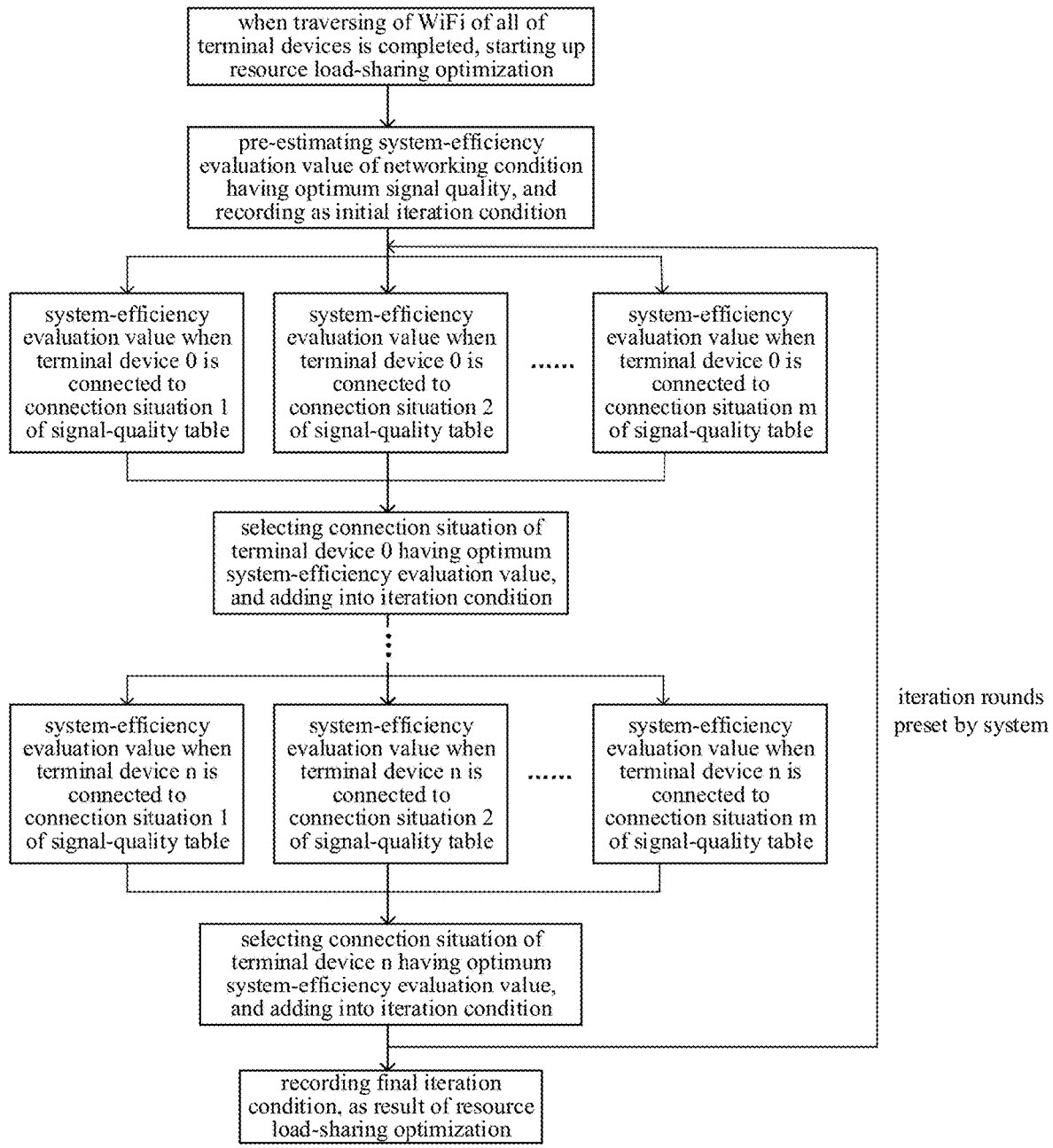
FIG. 6 is a schematic flow chart of the iteration of another method for allocating edge-computation resources according to one or more embodiments of the present application.

For example, as shown in FIG. 6, in the step 102, the processor may, firstly, based on the initial state that all of the WiFi terminal devices that apply for accessing (having completed the WiFi polling and the signal-quality table, but having not started up the services) are connected to the optimum-signal server, perform the iteration, pre-estimate and calculate the overall assessed system-efficiency value at this point; subsequently, according to the networking condition that the first WiFi terminal device (the terminal device 0) is connected to the edge server having the second best signal quality, pre-estimate and calculate the overall assessed system-efficiency value at this point, and poll the first WiFi terminal device; based on all of the networking conditions in the signal-quality table that satisfy the requirements, pre-estimate the overall assessed system-efficiency value of each of the networking conditions, and select the connection relation of the WiFi terminal device that has the optimum overall assessed system-efficiency value as the starting condition of the next step of the iteration; select the second WiFi terminal device, poll the networking conditions of its WiFi signal-quality table, pre-estimate the system-efficiency evaluation value of each of the networking conditions, and select the connection relation that has the maximum assessed system-efficiency value as the starting condition of the next step of the iteration; and, subsequently, sequentially select each of the WiFi terminal devices, repeat the above process, and select the connection relation that has the maximum assessed system-efficiency value of each of the WiFi terminal devices to add into the iteration condition. After all of the WiFi terminal devices are completely polled, the processor may also, based on the iteration condition at this point, initiate the iterative optimization again from the first terminal device. The rounds of the cumulative algorithm iteration may be configured randomly, and the final iteration condition obtained after one round of the iteration or multiple rounds of the iteration are completed is recorded as the connection relation having the optimum overall efficiency, to complete the determination on the target edge servers that the terminal devices to be allocated individually correspond to.

Step 103: connecting the terminal devices to be allocated to the individually corresponding target edge servers, and controlling the target edge servers to start up services of the individually corresponding terminal devices to be allocated.

It may be understood that, in this step, the processor may connect the terminal devices to be allocated to the individually corresponding target edge servers, and control the target edge servers to start up the services of the individually corresponding terminal devices to be allocated, to realize the networking and accessing of the terminal devices to be allocated.

Correspondingly, in this step, the processor may, after the target edge servers that all of the terminal devices to be allocated individually correspond to are determined, connect the terminal devices to be allocated to the individually corresponding target edge servers. The processor may also, after the target edge servers corresponding to the current terminal device to be allocated is determined, connect the current terminal device to be allocated to the corresponding target edge servers, and return to the step 102, to continuously determine the target edge servers corresponding to the next terminal device to be allocated, till all of the target edge servers that all of the terminal devices to be allocated individually correspond to are completely determined, wherein the current terminal device to be allocated is any one of the terminal devices to be allocated.

Figure 7:
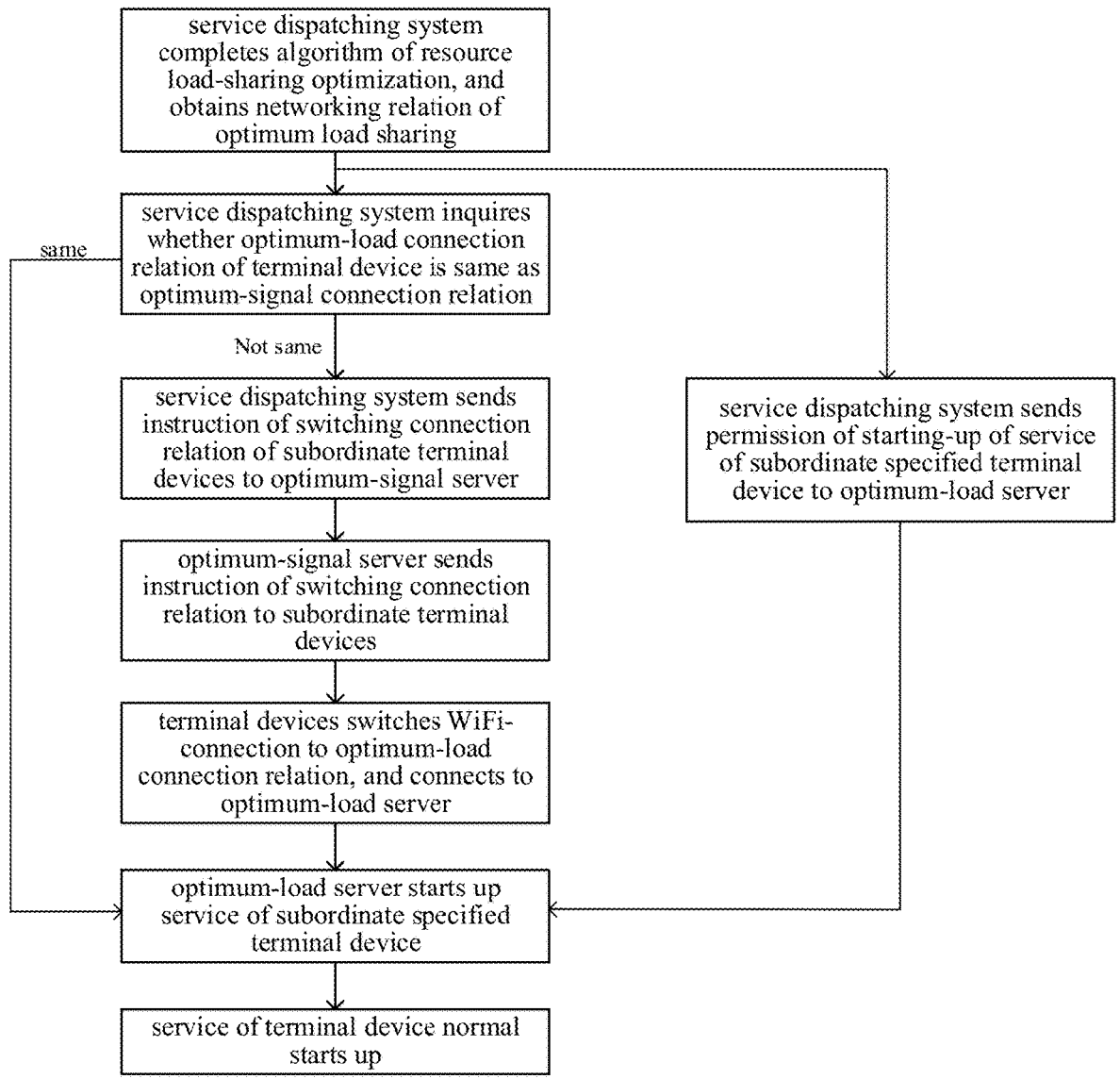
FIG. 7 is a schematic diagram of the connection switching of the terminal devices to be allocated of another method for allocating edge-computation resources according to one or more embodiments of the present application.

In some embodiments, the particular mode of connecting the terminal devices to be allocated to the individually corresponding target edge servers by the processor in this step may be configured by a person skilled in the art freely according to practical scenes and user demands. For example, when the terminal devices to be allocated are connected to the individually corresponding optimum-signal servers, the processor may change the WiFi-connections of the terminal devices to be allocated from the individually connected optimum-signal servers to the individually corresponding target edge servers. As shown in FIG. 7, the processor of the service dispatching system device may, according to the WiFi-connection-signal-quality tables of the terminal devices to be allocated, know which of the optimum-signal servers the current terminal device to be allocated is attached to; and when the optimum-signal server corresponding to the current terminal device to be allocated is not a target edge server corresponding to it, notify the attached current terminal device to be allocated by using the optimum-signal server, and switch the WiFi of the current terminal device to be allocated to be connected to the target edge server. Accordingly, after the current terminal device to be allocated is connected to the target edge server corresponding to it, the target edge server sends to the service dispatching system device a request of starting up the relevant service, and the service dispatching system device responds by permitting to start up the relevant service, whereby the current terminal device to be allocated completes the service starting-up, and the networking succeeds.

It should be noted that the application scenes of the method for allocating edge-computation resources according to the present embodiment are not limited in the present embodiment. For example, the method may be applied in environments where the WiFi terminal devices are deployed with a high density, for example, in environments such as factory buildings, shopping malls and supermarkets, to solve the problem in the prior art that, when multiple WiFi terminal devices such as sensors and cameras are connected to multiple edge servers, the distribution of the connected WiFi terminal devices and edge servers might be unbalanced, thereby preventing the risk that some of the edge servers load excessively many services and the edge servers loading the excessively many services have insufficient resources.

In the present embodiment, by determining the target edge servers that the terminal devices to be allocated individually correspond to according to the WiFi-connection data and the resource-occupation states of the edge servers, the embodiments of the present application may automatically select a balanced load-sharing networking strategy in response to the initial networking of a distributed WiFi edge-computation system or a WiFi terminal device being newly added, to realize the effect of load sharing of the edge-computation resources, and improve the efficiency of the application of edge computation.

As corresponding to the above process embodiments, an embodiment of the present application further provides an apparatus for allocating edge-computation resources, and the apparatus for allocating edge-computation resources described below and the method for allocating edge-computation resources described above may correspondingly refer to each other.

Figure 8:
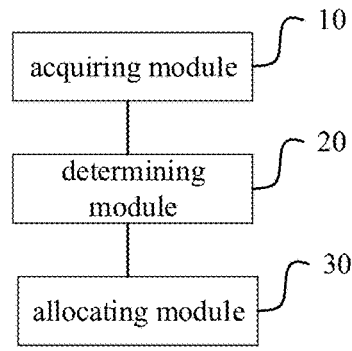
FIG. 8 is a structural block diagram of an apparatus for allocating edge-computation resources according to one or more embodiments of the present application.

Referring to FIG. 8, FIG. 8 is a structural block diagram of an apparatus for allocating edge-computation resources according to an embodiment of the present application. The apparatus may include:

an acquiring module 10 configured for acquiring WiFi-connection data of terminal devices to be allocated, wherein the WiFi-connection data contain identifier data of edge servers that the terminal devices to be allocated are individually correspondingly connectable to;

a determining module 20 configured for, according to the WiFi-connection data and resource-occupation states of the edge servers, determining target edge servers that the terminal devices to be allocated individually correspond to; and an allocating module 30 configured for connecting the terminal devices to be allocated to the individually corresponding target edge servers, and controlling the target edge servers to start up services of the individually corresponding terminal devices to be allocated.

In some embodiments, the acquiring module 10 may be configured for receiving the WiFi-connection data that are sent by optimum-signal servers that the terminal devices to be allocated are individually connected to, wherein the optimum-signal servers refer to connectable edge servers having highest connection-signal qualities among connectable edge servers that the terminal devices to be allocated individually correspond to, and the WiFi-connection data further contain data of the connection-signal qualities of the connectable edge servers that the terminal devices to be allocated individually correspond to.

In some embodiments, the apparatus may further include:
    a first controlling module configured for controlling a current terminal device to be allocated to perform WiFi-connecting sequentially to the edge servers, and detecting data of the connection-signal qualities of the connected edge servers, wherein the current terminal device to be allocated is any one of the terminal devices to be allocated; and
    a second controlling module configured for controlling the current terminal device to be allocated to be connected to a current optimum-signal server, and sending current WiFi-connection data to the current optimum-signal server, wherein the current optimum-signal server refers to a connectable edge server having a highest connection-signal quality among the connectable edge servers that the current terminal device to be allocated corresponds to, and the current WiFi-connection data contain identifier data of the edge servers that the current terminal device to be allocated has already been connected to and have data of the connection-signal qualities higher than a signal-quality threshold.

In some embodiments, the allocating module 30 may include:
    a connection adjusting submodule configured for changing WiFi-connections of the terminal devices to be allocated from the individually connected optimum-signal servers to the individually corresponding target edge servers.

In some embodiments, the acquiring module 10 may include:
    a first controlling submodule configured for controlling a current terminal device to be allocated to perform WiFi-connecting sequentially to the edge servers, and detecting data of the connection-signal qualities of the connected edge servers, wherein the current terminal device to be allocated is any one of the terminal devices to be allocated;
    a second controlling submodule configured for controlling the current terminal device to be allocated to send current WiFi-connection data to the connected connectable edge servers, wherein the current WiFi-connection data contain identifier data of the edge servers that the current terminal device to be allocated is currently connected to and have data of the connection-signal qualities higher than a signal-quality threshold, and the data and the connection-signal qualities; and
    an acquiring submodule configured for, according to the received current WiFi-connection data sent by the connectable edge servers that the current terminal device to be allocated corresponds to, acquiring the WiFi-connection data of the current terminal device to be allocated.

In some embodiments, the determining module 20 may be configured for, according to the resource-occupation states and a resource-safety threshold of the edge servers, and WiFi-connection data and pre-estimated resource-occupation states of all of WiFi terminal devices, determining the target edge servers that the terminal devices to be allocated individually correspond to, wherein the all of WiFi terminal devices include the terminal devices to be allocated and already-allocated terminal devices that the edge servers are individually connected to.

In some embodiments, the determining module 20 may be configured for, according to the resource-occupation states and the resource-safety threshold of the edge servers, and the WiFi-connection data and the pre-estimated resource-occupation states of all of the WiFi terminal devices, calculating a system-efficiency evaluation value when any one of the connectable edge servers that the terminal devices to be allocated individually correspond to is connected, and by using the system-efficiency evaluation values, determining the target edge servers that the terminal devices to be allocated individually correspond to.

In some embodiments, the determining module 20 may include:
    an initially configuring submodule configured for determining the optimum-signal servers that the terminal devices to be allocated individually correspond to as individually corresponding edge servers to be connected, wherein the optimum-signal servers refer to connectable edge servers having highest connection-signal qualities among connectable edge servers that the terminal devices to be allocated individually correspond to;
    an iteration determining submodule configured for, according to a preset iteration sequence, determining the current terminal device to be allocated, wherein the current terminal device to be allocated is any one of the terminal devices to be allocated;
    an assessing and calculating submodule configured for, according to the resource-occupation states and a resource-safety threshold of the edge servers, and WiFi-connection data and pre-estimated resource-occupation states of all of WiFi terminal devices, calculating assessed system-efficiency values that all of the connectable edge servers corresponding to the current terminal device to be allocated individually correspond to;
    an iteration updating submodule configured for, according to the system-efficiency evaluation values, updating the edge server to be connected corresponding to the current terminal device to be allocated;
    an iteration determining submodule configured for determining whether the current iteration time quantity reaches an iteration threshold;
    a completion determining submodule configured for, when the iteration threshold is reached, determining the edge servers to be connected that the terminal devices to be allocated individually correspond to as individually corresponding target edge servers; and
    an iteration submodule configured for, when the iteration threshold is not reached, adding 1 to the current iteration time quantity, according to the preset iteration sequence, determining a next terminal device to be allocated to be the current terminal device to be allocated, and sending a starting-up signal to the assessing and calculating submodule.

In some embodiments, the assessing and calculating submodule may be configured for, by using $(\Pi(0{:}n)Fs(Sx\text{-}y\text{-}Gs))*(\Pi(0{:}m)(Fcpu(RRcpu\text{-}Gcpu)*Fgpu(RRgpu\text{-}Ggpu)*Fmem(RRmem\text{-}Gmem)*Fdisk(RRdisk\text{-}Gdisk)*Fnet(RRnet\text{-}Gnet)*Fwifi(RRwifi\text{-}Gwifi)*F\Delta disk((RRdisk\text{-}Gdisk)/\Delta RRd\ isk\text{-}Gtime)))$, pre-estimating and calculating the system-efficiency evaluation values after the current terminal device to be allocated is connected to each of the corresponding connectable edge servers in response to the terminal devices to be allocated other than the current terminal device to be allocated being connected to the individually corresponding edge servers to be connected, wherein n is a quantity of the WiFi terminal devices connected to the edge servers, Fs is a signal-quality weight, Sx-y is a signal quality between the WiFi terminal device x and the edge server y, Gs is a signal-quality threshold, m is a quantity of the edge servers, Fcpu, Fgpu, Fmem, Fdisk, Fnet, Fwifi and FΔdisk are a CPU-computational-resource weight, an AI-computational-resource weight, an memory-capacity-resource weight, a hard-disk-storage-resource weight, a network-transmission-resource weight, a network-access-resource weight and a hard-disk-storage-consumption-speed weight respectively, RRcpu, RRgpu, RRmem, RRdisk, RRnet, RRwifi and ΔRRdisk are a remaining CPU computational resource, a remaining AI computational resource, a remaining memory capacity resource, a remaining hard-disk storage resource, a remaining network-transmission resource, a remaining network-access resource and a remaining hard-disk storage consumption speed respectively, and Gcpu, Ggup, Gmem, Gdisk, Gnet, Gwifi and Gtime are a CPU-computational-resource remaining safety threshold, an AI-computational-resource remaining safety threshold, an memory-capacity-resource remaining safety threshold, a hard-disk-storage-resource remaining safety threshold, a network-transmission-resource remaining safety threshold, a network-access-resource remaining safety threshold and a hard-disk-storage-consumption-speed remaining safety threshold respectively.

In the present embodiment, the embodiments of the present application, by, by using the determining module 20, according to the WiFi-connection data and the resource-occupation states of the edge servers, determining the target edge servers that the terminal devices to be allocated individually correspond to, may, in the initial networking of a distributed WiFi edge-computation system or a WiFi terminal device is newly added, automatically select a balanced load-sharing networking strategy, to realize the effect of load sharing of the edge-computation resources, and improve the efficiency of the application of edge computation.

As corresponding to the above process embodiments, an embodiment of the present application further provides a device for allocating edge-computation resources, and the device for allocating edge-computation resources described below and the method for allocating edge-computation resources described above may correspondingly refer to each other.

Figure 9:
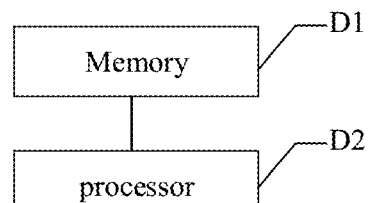
FIG. 9 is a schematic structural diagram of a device for allocating edge-computation resources according to one or more embodiments of the present application.

Referring to FIG. 9, FIG. 9 is a schematic structural diagram of a device for allocating edge-computation resources according to an embodiment of the present application. The allocating device may include:
- a memory D1 configured for storing a computer-readable instruction; and
- one or more processors D2 configured for, when executing the computer-readable instruction, implementing the steps of the method for allocating edge-computation resources according to the above process embodiments.

Figure 10:
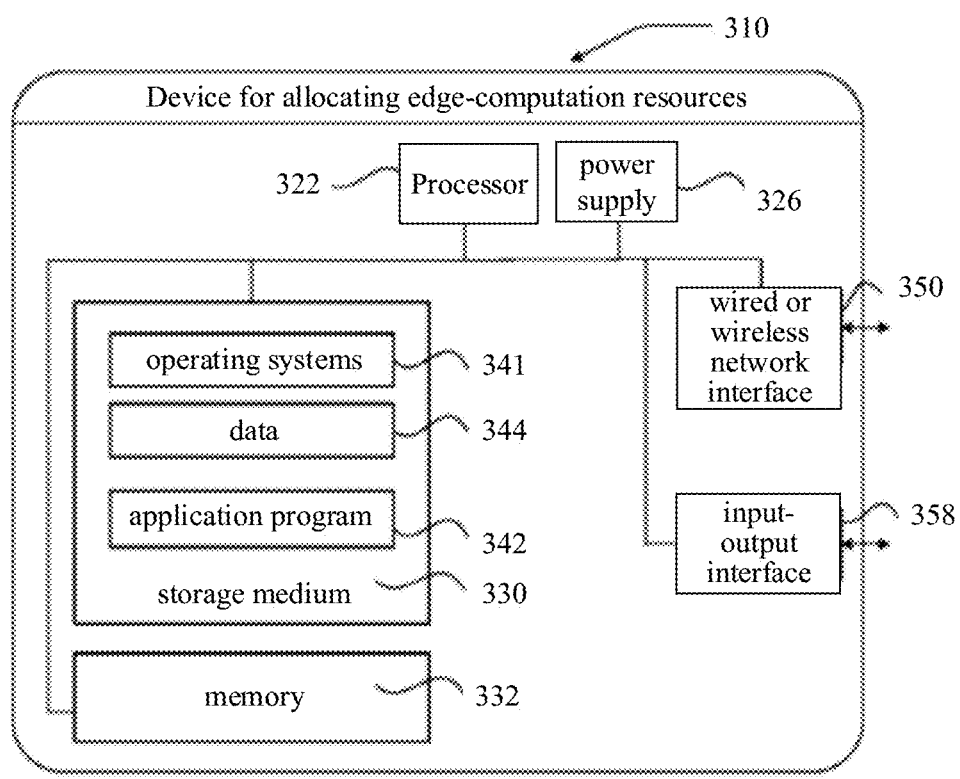
FIG. 10 is a particular schematic structural diagram of a device for allocating edge-computation resources according to one or more embodiments of the present application.

In some embodiments, referring to FIG. 10, FIG. 10 is a particular schematic structural diagram of a device for allocating edge-computation resources according to an embodiment of the present application. The allocating device 310 may be highly different due to different configurations or performances. It may include one or more processors (central processing units, CPU) 322 (for example, one or more processors) and a memory 332, and one or more storage mediums 330 (for example, one or more mass storage devices) storing an application program 342 or data 344. Wherein the memory 332 and the storage mediums 330 may be short-term storage or permanent storage. The program stored in the storage mediums 330 may include one or more modules (not shown in the figure), and each of the modules may contain a series of instruction operations to a data processing device. Further, the central processing units 322 may be configured for communicating with the storage mediums 330, and executing in the allocating device 310 the series of instruction operations in the storage mediums 330.

The allocating device 310 may further include one or more power supplies 326, one or more wired or wireless network interfaces 350, one or more input-output interfaces 358 and/or one or more operating systems 341, for example, Windows Server™, Mac OS X™, Unix™, Linux™ and FreeBSD™.

The allocating device 310 may be a service dispatch system device.

The steps of the method for allocating edge-computation resources described above may be implemented by using the structure of the device for allocating edge-computation resources.

As corresponding to the above process embodiments, an embodiment of the present application further provides a computer-readable storage medium, and the computer-readable storage medium described below and the method for allocating edge-computation resources described above may correspondingly refer to each other.

One or more non-volatile computer-readable storage mediums storing a computer-readable instruction, wherein the computer-readable instruction, when executed by one or more processors, causes the one or more processors to implement the steps of the method for allocating edge-computation resources according to the above process embodiments.

The computer-readable storage medium may be various readable storage mediums that may store a program code, such as a USB flash disk, a mobile hard disk drive, a Read-Only Memory (ROM), a Random Access Memory (RAM), a diskette and an optical disk.

The embodiments of the description are described in the mode of progression, each of the embodiments emphatically describes the differences from the other embodiments, and the same or similar parts of the embodiments may refer to each other. Regarding the apparatus, the device and the computer-readable storage medium according to the embodiments, because they correspond to the methods according to the embodiments, they are described simply, and the relevant parts may refer to the description on the methods.

The method, apparatus and device for allocating edge-computation resources and computer-readable storage medium according to the present application are described in detail above. The principle and the embodiments of the present application are described herein with reference to the particular examples, and the description of the above embodiments is merely intended to facilitate to comprehend the method according to the present application and its core concept. It should be noted that a person skilled in the art may make improvements and modifications on the present application without departing from the principle of the present application, and all of the improvements and modifications fall within the protection scope of the claims of the present application.

The invention claimed is:
1. A method for allocating edge-computation resources, wherein the method comprises:

acquiring WiFi-connection data of terminal devices to be allocated, wherein the acquired WiFi-connection data comprise identifier data of edge servers that the terminal devices to be allocated are individually correspondingly connectable to;

according to the acquired WiFi-connection data and resource-occupation states of the edge servers, determining target edge servers that the terminal devices to be allocated individually correspond to; and connecting the terminal devices to be allocated to the individually corresponding target edge servers, and controlling the target edge servers to start up services of the individually corresponding terminal devices to be allocated;

wherein the step of, according to the acquired WiFi-connection data and the resource-occupation states of the edge servers, determining the target edge servers that the terminal devices to be allocated individually correspond to comprises:

according to the resource-occupation states and a resource-safety threshold of the edge servers, and the acquired WiFi-connection data and pre-estimated resource-occupation states of all of WiFi terminal devices, determining the target edge servers that the terminal devices to be allocated individually correspond to, wherein the all of WiFi terminal devices comprise the terminal devices to be allocated and already-allocated terminal devices that the edge servers are individually connected to.

2. The method for allocating edge-computation resources according to claim 1, wherein the step of acquiring the WiFi-connection data of the terminal devices to be allocated comprises:

receiving the acquired WiFi-connection data that are sent by optimum-signal servers that the terminal devices to be allocated are individually connected to, wherein the optimum-signal servers refer to connectable edge servers having highest connection-signal qualities among connectable edge servers that the terminal devices to be allocated individually correspond to, and the acquired WiFi-connection data further comprise data of the connection-signal qualities of the connectable edge servers that the terminal devices to be allocated individually correspond to.

3. The method for allocating edge-computation resources according to claim 2, wherein before the step of receiving the acquired WiFi-connection data that are sent by the optimum-signal servers that the terminal devices to be allocated are individually connected to, the method further comprises:

controlling a current terminal device to be allocated to perform WiFi-connecting sequentially to the edge servers, and detecting data of the connection-signal qualities of the connected edge servers, wherein the current terminal device to be allocated is any one of the terminal devices to be allocated; and controlling the current terminal device to be allocated to be connected to a current optimum-signal server, and sending current WiFi-connection data to the current optimum-signal server, wherein the current optimum-signal server refers to a connectable edge server having a highest connection-signal quality among the connectable edge servers that the current terminal device to be allocated corresponds to, and the current WiFi-connection data comprise identifier data of the edge servers that the current terminal device to be allocated has already been connected to and have data of the connection-signal qualities higher than a signal-quality threshold.

4. The method for allocating edge-computation resources according to claim 2, wherein the step of connecting the terminal devices to be allocated to the individually corresponding target edge servers comprises:

changing WiFi-connections of the terminal devices to be allocated from the individually connected optimum-signal servers to the individually corresponding target edge servers.

5. The method for allocating edge-computation resources according to claim 1, wherein the step of acquiring the WiFi-connection data of the terminal devices to be allocated comprises:

controlling a current terminal device to be allocated to perform WiFi-connecting sequentially to the edge servers, and detecting data of the connection-signal qualities of the connected edge servers, wherein the current terminal device to be allocated is any one of the terminal devices to be allocated;

controlling the current terminal device to be allocated to send current WiFi-connection data to the connected connectable edge servers, wherein the current WiFi-connection data comprise identifier data of the edge servers that the current terminal device to be allocated is currently connected to and have data of the connection-signal qualities higher than a signal-quality threshold, and the data and the connection-signal qualities; and according to the received current WiFi-connection data sent by the connectable edge servers that the current terminal device to be allocated corresponds to, acquiring the WiFi-connection data of the current terminal device to be allocated.

6. The method for allocating edge-computation resources according to claim 1, wherein the step of, according to the resource-occupation states and the resource-safety threshold of the edge servers, and the acquired WiFi-connection data and the pre-estimated resource-occupation states of all of the WiFi terminal devices, determining the target edge servers that the terminal devices to be allocated individually correspond to comprises:

according to the resource-occupation states and the resource-safety threshold of the edge servers, and the acquired WiFi-connection data and the pre-estimated resource-occupation states of all of the WiFi terminal devices, calculating a system-efficiency evaluation value when any one of the connectable edge servers that the terminal devices to be allocated individually correspond to is connected, and determining the target edge servers that the terminal devices to be allocated individually correspond to by using the system-efficiency evaluation values.

7. The method for allocating edge-computation resources according to claim 1, wherein the step of, according to the resource-occupation states and the resource-safety threshold of the edge servers, and the acquired WiFi-connection data and the pre-estimated resource-occupation states of all of the WiFi terminal devices, calculating the system-efficiency evaluation value when any one of the connectable edge servers that the terminal devices to be allocated individually correspond to is connected, and determining the target edge servers that the terminal devices to be allocated individually correspond to by using the system-efficiency evaluation values comprises:

determining the optimum-signal servers that the terminal devices to be allocated individually correspond to as individually corresponding edge servers to be connected, wherein the optimum-signal servers refer to connectable edge servers having highest connection-signal qualities among connectable edge servers that the terminal devices to be allocated individually correspond to;

determining the current terminal device to be allocated according to a preset iteration sequence, wherein the current terminal device to be allocated is any one of the terminal devices to be allocated;

according to the resource-occupation states and the resource-safety threshold of the edge servers, and the acquired WiFi-connection data and the pre-estimated resource-occupation states of all of WiFi terminal devices, calculating system-efficiency evaluation values that all of the connectable edge servers corresponding to the current terminal device to be allocated individually correspond to;

updating the edge server to be connected corresponding to the current terminal device to be allocated according to the calculated system-efficiency evaluation values;

when a current iteration time quantity reaches an iteration threshold, determining the edge servers to be connected that the terminal devices to be allocated individually correspond to as individually corresponding target edge servers; and when the current iteration time quantity does not reach the iteration threshold, adding 1 to the current iteration time quantity, determining a next terminal device to be allocated to be the current terminal device to be allocated according to the preset iteration sequence, and executing the step of, according to the resource-occupation states and the resource-safety threshold of the edge servers, and the acquired WiFi-connection data and the pre-estimated resource-occupation states of all of the WiFi terminal devices, calculating the system-efficiency evaluation values that all of the connectable edge servers corresponding to the current terminal device to be allocated individually correspond to.

8. The method for allocating edge-computation resources according to claim 7, wherein the step of, according to the resource-occupation states and the resource-safety threshold of the edge servers, and the acquired WiFi-connection data and the pre-estimated resource-occupation states of all of the WiFi terminal devices, calculating the system-efficiency evaluation values that all of the connectable edge servers corresponding to the current terminal device to be allocated individually correspond to comprises:

by using $(\Pi(0:n)Fs(Sx\text{-}y\text{-}Gs))*(\Pi(0:m)(Fcpu(RRcpu\text{-}Gcpu)*Fgpu\ (RRgpu\text{-}Ggpu)*Fmem(RRmem\text{-}Gmem)*Fdisk(RRdisk\text{-}Gdisk)*Fnet(RRnet\text{-}Gnet)*Fwifi(RRwifi\text{-}Gwifi)*F\Delta disk((RRdisk\text{-}Gdisk)/\Delta RRdisk\text{-}Gtime)))$, pre-estimating and calculating the system-efficiency evaluation values after the current terminal device to be allocated is connected to each of the corresponding connectable edge servers in response to the terminal devices to be allocated other than the current terminal device to be allocated being connected to the individually corresponding edge servers to be connected, wherein n is a quantity of the WiFi terminal devices connected to the edge servers, Fs is a signal-quality weight, Sx-y is a signal quality between the WiFi terminal device x and the edge server y, Gs is a signal-quality threshold, m is a quantity of the edge servers, Fcpu, Fgpu, Fmem, Fdisk, Fnet, Fwifi and F$\Delta$disk are a CPU-computational-resource weight, an AI-computational-resource weight, an memory-capacity-resource weight, a hard-disk-storage-resource weight, a network-transmission-resource weight, a network-access-resource weight and a hard-disk-storage-consumption-speed weight respectively, RRcpu, RRgpu, RRmem, RRdisk, RRnet, RRwifi and ARRdisk are a remaining CPU computational resource, a remaining AI computational resource, a remaining memory capacity resource, a remaining hard-disk storage resource, a remaining network-transmission resource, a remaining network-access resource and a remaining hard-disk storage consumption speed respectively, and Gcpu, Ggup, Gmem, Gdisk, Gnet, Gwifi and Gtime are a CPU-computational-resource remaining safety threshold, an AI-computational-resource remaining safety threshold, an memory-capacity-resource remaining safety threshold, a hard-disk-storage-resource remaining safety threshold, a network-transmission-resource remaining safety threshold, a network-access-resource remaining safety threshold and a hard-disk-storage-consumption-speed remaining safety threshold respectively.

9. The method for allocating edge-computation resources according to claim 1, wherein the terminal devices to be allocated are WiFi terminal devices that are required to be allocated to be connected to the corresponding target edge servers and start starting up corresponding services.

10. The method for allocating edge-computation resources according to claim 9, wherein each of the WiFi terminal devices has built-in WiFi-connection relations of all of the edge servers, to support WiFi-connections with the edge servers.

11. The method for allocating edge-computation resources according to claim 1, wherein the resource-occupation states of each of the edge servers comprise states of occupation of any one or more of a CPU computational resource, an AI computational resource, a memory capacity resource, a hard-disk storage resource, a network transmission resource, a network access resource and a hard-disk-storage-resource consumption speed.

12. A device for allocating edge-computation resources, wherein the device comprises a memory and one or more processors, the memory stores a computer-readable instruction, and the computer-readable instruction, when executed by the one or more processors, causes the one or more processors to implement operations comprising:

acquiring WiFi-connection data of terminal devices to be allocated, wherein the acquired WiFi-connection data comprise identifier data of edge servers that the terminal devices to be allocated are individually correspondingly connectable to;

according to the acquired WiFi-connection data and resource-occupation states of the edge servers, determining target edge servers that the terminal devices to be allocated individually correspond to; and connecting the terminal devices to be allocated to the individually corresponding target edge servers, and controlling the target edge servers to start up services of the individually corresponding terminal devices to be allocated;

wherein the operation of, according to the acquired WiFi-connection data and the resource-occupation states of the edge servers, determining the target edge servers that the terminal devices to be allocated individually correspond to comprises:

according to the resource-occupation states and a resource-safety threshold of the edge servers, and the acquired WiFi-connection data and pre-estimated resource-occupation states of all of WiFi terminal devices, determining the target edge servers that the terminal devices to be allocated individually correspond to, wherein the all of WiFi terminal devices comprise the terminal devices to be allocated and already-allocated terminal devices that the edge servers are individually connected to.

13. The device for allocating edge-computation resources according to claim 11, wherein the operation of, according to the resource-occupation states and the resource-safety threshold of the edge servers, and the acquired WiFi-connection data and the pre-estimated resource-occupation states of all of the WiFi terminal devices, determining the target edge servers that the terminal devices to be allocated individually correspond to comprises:

according to the resource-occupation states and the resource-safety threshold of the edge servers, and the acquired WiFi-connection data and the pre-estimated resource-occupation states of all of the WiFi terminal devices, calculating a system-efficiency evaluation value when any one of the connectable edge servers that the terminal devices to be allocated individually correspond to is connected, and determining the target edge servers that the terminal devices to be allocated individually correspond to by using the system-efficiency evaluation values.

14. The device for allocating edge-computation resources according to claim 12, wherein the operation of, according to the resource-occupation states and the resource-safety threshold of the edge servers, and the acquired WiFi-connection data and the pre-estimated resource-occupation states of all of the WiFi terminal devices, calculating the system-efficiency evaluation value when any one of the connectable edge servers that the terminal devices to be allocated individually correspond to is connected, and determining the target edge servers that the terminal devices to be allocated individually correspond to by using the system-efficiency evaluation values comprises:

determining the optimum-signal servers that the terminal devices to be allocated individually correspond to as individually corresponding edge servers to be connected, wherein the optimum-signal servers refer to connectable edge servers having highest connection-signal qualities among connectable edge servers that the terminal devices to be allocated individually correspond to;

determining the current terminal device to be allocated according to a preset iteration sequence, wherein the current terminal device to be allocated is any one of the terminal devices to be allocated;

according to the resource-occupation states and the resource-safety threshold of the edge servers, and the acquired WiFi-connection data and the pre-estimated resource-occupation states of all of WiFi terminal devices, calculating system-efficiency evaluation values that all of the connectable edge servers corresponding to the current terminal device to be allocated individually correspond to;

updating the edge server to be connected corresponding to the current terminal device to be allocated according to the calculated system-efficiency evaluation values;

when a current iteration time quantity reaches an iteration threshold, determining the edge servers to be connected that the terminal devices to be allocated individually correspond to as individually corresponding target edge servers; and when the current iteration time quantity does not reach the iteration threshold, adding 1 to the current iteration time quantity, determining a next terminal device to be allocated to be the current terminal device to be allocated according to the preset iteration sequence, and executing the step of, according to the resource-occupation states and the resource-safety threshold of the edge servers, and the acquired WiFi-connection data and the pre-estimated resource-occupation states of all of the WiFi terminal devices, calculating the system-efficiency evaluation values that all of the connectable edge servers corresponding to the current terminal device to be allocated individually correspond to.

15. A non-transitory computer-readable storage medium, storing a computer-readable instruction, wherein the computer-readable instruction, when executed by one or more processors, causes the one or more processors to implement operations comprising:

acquiring WiFi-connection data of terminal devices to be allocated, wherein the acquired WiFi-connection data comprise identifier data of edge servers that the terminal devices to be allocated are individually correspondingly connectable to;

according to the acquired WiFi-connection data and resource-occupation states of the edge servers, determining target edge servers that the terminal devices to be allocated individually correspond to; and connecting the terminal devices to be allocated to the individually corresponding target edge servers, and controlling the target edge servers to start up services of the individually corresponding terminal devices to be allocated;

wherein the operation of, according to the acquired WiFi-connection data and the resource-occupation states of the edge servers, determining the target edge servers that the terminal devices to be allocated individually correspond to comprises:

according to the resource-occupation states and a resource-safety threshold of the edge servers, and the acquired WiFi-connection data and pre-estimated resource-occupation states of all of WiFi terminal devices, determining the target edge servers that the terminal devices to be allocated individually correspond to, wherein the all of WiFi terminal devices comprise the terminal devices to be allocated and already-allocated terminal devices that the edge servers are individually connected to.

16. The non-transitory computer-readable storage medium according to claim 15, wherein the operation of, according to the resource-occupation states and the resource-safety threshold of the edge servers, and the acquired WiFi-connection data and the pre-estimated resource-occupation states of all of the WiFi terminal devices, determining the target edge servers that the terminal devices to be allocated individually correspond to comprises:

according to the resource-occupation states and the resource-safety threshold of the edge servers, and the acquired WiFi-connection data and the pre-estimated resource-occupation states of all of the WiFi terminal devices, calculating a system-efficiency evaluation value when any one of the connectable edge servers that the terminal devices to be allocated individually correspond to is connected, and determining the target edge servers that the terminal devices to be allocated individually correspond to by using the system-efficiency evaluation values.

17. The non-transitory computer-readable storage medium according to claim 15, wherein the operation of, according to the resource-occupation states and the resource-safety threshold of the edge servers, and the acquired WiFi-connection data and the pre-estimated resource-occupation states of all of the WiFi terminal devices, calculating the system-efficiency evaluation value when any one of the connectable edge servers that the terminal devices to be allocated individually correspond to is connected, and determining the target edge servers that the terminal devices to be allocated individually correspond to by using the system-efficiency evaluation values comprises:

determining the optimum-signal servers that the terminal devices to be allocated individually correspond to as individually corresponding edge servers to be connected, wherein the optimum-signal servers refer to connectable edge servers having highest connection-signal qualities among connectable edge servers that the terminal devices to be allocated individually correspond to;

determining the current terminal device to be allocated according to a preset iteration sequence, wherein the current terminal device to be allocated is any one of the terminal devices to be allocated;

according to the resource-occupation states and the resource-safety threshold of the edge servers, and the acquired WiFi-connection data and the pre-estimated resource-occupation states of all of WiFi terminal devices, calculating system-efficiency evaluation values that all of the connectable edge servers corresponding to the current terminal device to be allocated individually correspond to;

updating the edge server to be connected corresponding to the current terminal device to be allocated according to the calculated system-efficiency evaluation values;

when a current iteration time quantity reaches an iteration threshold, determining the edge servers to be connected that the terminal devices to be allocated individually correspond to as individually corresponding target edge servers; and when the current iteration time quantity does not reach the iteration threshold, adding 1 to the current iteration time quantity, determining a next terminal device to be allocated to be the current terminal device to be allocated according to the preset iteration sequence, and executing the step of, according to the resource-occupation states and the resource-safety threshold of the edge servers, and the acquired WiFi-connection data and the pre-estimated resource-occupation states of all of the WiFi terminal devices, calculating the system-efficiency evaluation values that all of the connectable edge servers corresponding to the current terminal device to be allocated individually correspond to.

* * * * *